United States Patent [19]

Furuta

[11] Patent Number: 4,546,399
[45] Date of Patent: Oct. 8, 1985

[54] TAPE RECORDER

[75] Inventor: Kenji Furuta, Hachioji, Japan

[73] Assignee: Olympus Optical Company Limited, Tokyo, Japan

[21] Appl. No.: 586,645

[22] Filed: Mar. 8, 1984

Related U.S. Application Data

[63] Continuation of Ser. No. 286,389, Jul. 24, 1981, abandoned, which is a continuation of Ser. No. 968,743, Dec. 13, 1978, abandoned.

[30] Foreign Application Priority Data

Dec. 13, 1977 [JP] Japan .................... 52-167362[U]

[51] Int. Cl.⁴ .............................................. G11B 27/34
[52] U.S. Cl. .................................... 360/137; 360/72.1
[58] Field of Search ...................... 360/72.1, 72.3, 137;
368/10; 340/147 R, 711, 365 E; 307/115, 217,
241, 242; 328/103, 152, 70, 71; 455/158, 344;
D14/5, 6; 179/100.1 PS, 100.11; 364/705;
369/1, 6, 12

[56] References Cited

U.S. PATENT DOCUMENTS

| D. 230,281 | 2/1974 | Tatsuta | D14/5 |
|---|---|---|---|
| D. 244,877 | 6/1976 | McLaughlin | D14/6 X |
| 3,611,151 | 10/1971 | Fernandez | 455/344 X |
| 3,777,121 | 12/1973 | Jamieson | 307/217 X |
| 3,824,472 | 7/1974 | Engel et al. | 455/344 X |
| 3,890,512 | 6/1975 | Kumakawa et al. | 307/218 X |
| 3,921,220 | 11/1975 | Primosch et al. | 179/72.3 |
| 4,015,090 | 3/1977 | Kitada | 179/100.1 PS X |
| 4,095,182 | 6/1978 | Kakigi | 455/158 |
| 4,101,742 | 7/1978 | Craig et al. | 179/100.1 PS X |
| 4,120,037 | 10/1978 | Sato | D14/5 |
| 4,140,896 | 2/1979 | Robertson | 360/137 X |
| 4,170,790 | 10/1979 | Satoh et al. | 360/137 |
| 4,172,231 | 10/1979 | d'Alayer de Costemore | 360/72.3 |
| 4,194,196 | 3/1980 | Mohiuddin | 340/711 |
| 4,208,686 | 6/1980 | Sato et al. | 360/137 |
| 4,214,281 | 7/1980 | Sato et al. | 360/137 |
| 4,225,890 | 9/1980 | Takenaka et al. | 360/72.1 |

FOREIGN PATENT DOCUMENTS

| 2842657 | 4/1979 | Fed. Rep. of Germany | 360/137 |
|---|---|---|---|
| 0562862 | 8/1977 | U.S.S.R. | 360/72.1 |

Primary Examiner—Donald McElheny, Jr.
Attorney, Agent, or Firm—Toren, McGeady, Stanger, Goldberg & Kiel

[57] ABSTRACT

The disclosed tape recorder includes an electronic indicating section and an operating section of multi-function such as a tape counter, a clock and a stopwatch. A switch member is provided for compulsorily stopping the function of the operating section of each function, if necessary.

8 Claims, 2 Drawing Figures

TAPE RECORDER

This application is a continuation of application Ser. No. 286,389, filed July, 24, 1981, now abandoned, which is a continuation of Ser. No. 968,743, filed Dec. 13, 1978, now abandoned.

BACKGROUND OF THE INVENTION

The present invention relates to a tape recorder having a recording-playback portion and a multi function electronic indicating portion and that may include devices such as a tape counter, a clock and a stopwatch.

In these days, consideration has been given to adding multi-function indicators such as the clock and a stopwatch or the like to the tape recorder portion of a tape recorder.

Such a tape recorder uses a common indicator that serves as a tape counter, a clock, a stopwatch and the like, and various operations such as switching each function on and off, resetting, other temporary instant stopping of a stopwatch, time correction and the like are carried out by pushing each button corresponding thereto.

If a tape recorder is superminiature such as a pocketable type, however, a button of the operating portion may erroneously be pushed while carrying it in a pocket or the like. The stopwatch function may sometimes be mistakenly stopped, or the time correction incorrectly operated.

SUMMARY OF THE INVENTION

An object of the present invention is to eliminate the above described disadvantages of a conventional tape recorder.

The present invention provides a tape recorder with a switch for affirmatively disabling operation of the controls for these portions if necessary, thereby preventing erroneous stopping and operation of a clock, a stopwatch and the like while the tape recorder is carried.

DESCRIPTION OF THE PREFERRED EMBODIMENT

Figure 1:
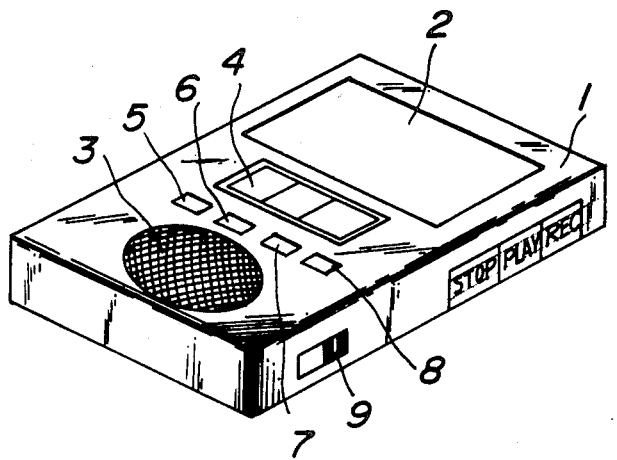
FIG. 1 is a perspective view showing one embodiment of a tape recorder according to the present invention.
Figure 2:
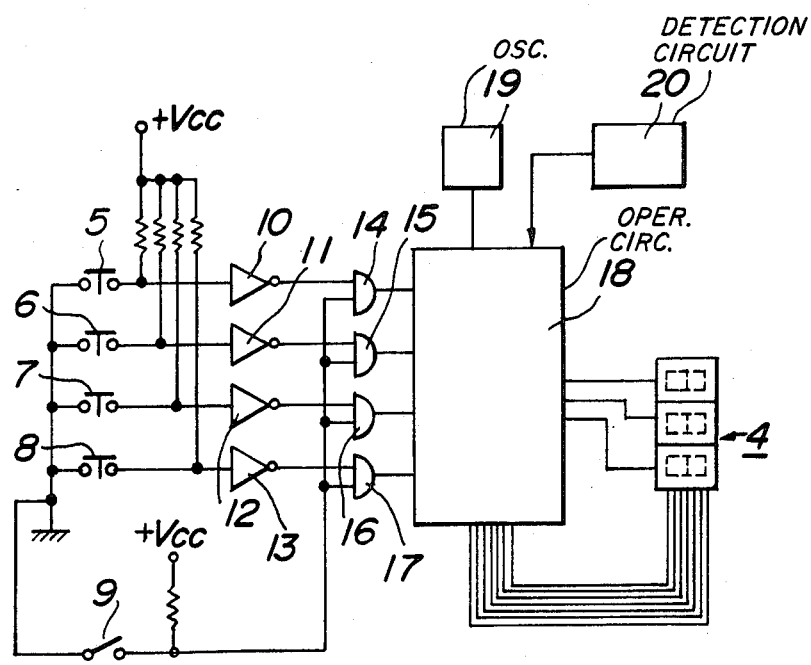
FIG. 2 is a circuit diagram of the same embodiment.

Referring now to FIGS. 1 and 2. FIG. 1 shows one embodiment assembled with clock and stopwatch functions in addition to a tape recorder function. In FIG. 1, a tape recorder body 1 includes a cassette chamber 2 and a speaker opening 3. Further, between the cassette chamber 2 and the speaker hole 3 is provided a seven segment indicator consisting of three digits and serving as a tape counter or in response to operation of an operating button which will be explained later.

Between the indicator 4 and the speaker hole 3 are arranged operating buttons 5, 6, 7 and 8 for each function. The button 5 is for switching a tape counter, a clock and a stopwatch, the button 6 is for resetting a tape counter, a clock and a stopwatch, the button 7 is for temporarily stopping a stopwatch, and the button 8 is for correcting time.

On the side surface of the tape recorder body 1 is provided a function stopping switch 9. This switch 9 is for compulsorily (i.e., affirmatively) disabling the operating functions of the buttons 5, 6, 7 and 8, and use is made of a slide switch which is hard to operate erroneously in a pocket or the like.

In this case, a concrete circuit for stopping the function by the switch 9 is constructed as shown in FIG. 2.

In FIG. 2, like reference numerals indicate corresponding parts shown in FIG. 1. In FIG. 2, the operating buttons 5, 6, 7 and 8 are ground at one end and further connected to one terminal of AND circuits 14, 15, 16 and 17 through inverters 10, 11, 12 and 13 at the other end. Each button 5, 6, 7, 8 is connected at each junction point of the inverters 10, 11, 12 and 13 to + power supply source Vcc through a resistor.

The function stopping button 9 is grounded at one end and connected to the other ends of the AND circuits 14, 15, 16 and 17. The switch 9 is further connected to the + power supply source Vcc through the resistances at junction points of the AND circuits 14, 15, 16 and 17.

Output terminals of the AND circuits 14, 15, 16 and 17 are connected to an operational circuit 18 consisting of LSI. This operational circuit 18 performs the operating functions of a tape counter, a clock and a stopwatch, so that it is responsive to the operation of the operating buttons 5, 6, 7 and 8 and indicates tape counter and time to the indicator 4.

In addition, in FIG. 2, reference numeral 19 is an oscillator, and reference numeral 20 is a detection circuit for generating the output corresponding to the tape position.

According to such tape recorder, when the switch 9 open as illustrated, the other terminals of the AND circuits 14, 15, 16 and 17 are maintained at "H" by the + power supply source Vcc. Therefore, if the button 5 is operated in this state, one terminal of the AND circuit 14 becomes "H" through the inverter 10, so that an AND condition is established and the output of the AND circuit 14 is applied to the operational circuit 18. Hence, each function of the tape counter, the clock and the stopwatch corresponding to the button 5 is enabled.

The other buttons 6, 7 and 8 function in the same manner and perform the above described predetermined action by the outputs of the AND circuits 15, 16 and 17 corresponding to these buttons 6, 7 and 8.

When a tape recorder is carried in a pocket or a bag from the above state, the switch 9 is closed. Then, the other terminals of the AND circuits 14, 15, 16 and 17 are directly grounded and kept at "L" thereafter.

Accordingly, in this state, even if either of the these operating buttons 5, 6, 7 and 8 is operated, all the AND circuits 14, 15, 16 and 17 are disabled and cannot establish an AND condition, so that no operating output is applied to the operational circuit 18. As a result, even if a button is erroneously pushed while carrying the tape recorder, any erroneous stopping or operation can be prevented.

Such tape recorder provides a function stopping switch for affirmatively stopping the function of the operating portion, if necessary, so that the erroneous stopping and operation of each function of the clock and the stopwatch can be prevented, and as a result, not only the tape recorder function but also additional clock and stopwatch functions can be operated in a constantly stable state, and precise tape counter indication and time indication can be expected.

The present invention is not limited to the above embodiment but can be modified without departing from the scope of the invention. For instance, in the above described embodiment, the clock and stopwatch functions are added to the tape recorder function, but any kind of function such as a computer function can be used.

As described above, it is possible to provide a tape recorder for preventing any erroneous stopping and erroneous operation of each function of the clock and the stopwatch while carrying the tape recorder by means of a function stopping switch for compulsorily stopping the function of the operating portion, if necessary.

What is claimed is:

1. A tape recorder comprising an operating section for performing a plurality of functions including, a recording-playback function and a plurality of other functions, an indicating section for indicating data from one of the functions performed, a plurality of input means for constraining said operating section to cause said indicating section to indicate data from one of said plurality of other functions, actuating means for individually and selectively actuating one of said input means, and disabling means coupled to each of said input means for simultaneously disabling operation of each of said input means so that said recording-playback function is undisturbed.

2. A tape recorder, comprising a housing, means in said housing for producing recording and playback a multifunction operating section in said housing and having a plurality of separate portions, one of said portions being one of a tape counter, a clock, a stopwatch; actuating means for selectively actuating separable ones of said portions, and disabling means for disabling the actuating means of separable ones of the portions of the operating section, an indicator coupled to each of the portions and responsive to operation of each of said portions for indicating the operating ones of the portions.

3. A tape recorder comprising an operating section for performing a plurality of functions including a recording-playback function and at least one other function, an indicating section for indicating data from one of the functions performed, a plurality of input means for constraining said operating sections to cause said indicating section to indicate data from a different function, actuating means for individually and selectively actuating one of said input means, and disabling means for disabling operation of said input means, said disabling means including a plurality of gates each between said actuating means and one of said input means, said gates being capable of being turned on to render said actuating means effective at the input means to which said gate is connected and of being turned off, and a switch for simultaneously turning said gates off.

4. A tape recorder as in claim 3, wherein said gates perform an AND function.

5. A tape recorder as in claim 4, wherein said gates each have two inputs, one of said inputs of said gate being connected to said switch, said switch being otherwise grounded.

6. A tape recorder, comprising a housing, means in said housing for producing recording and playback, a multifunction operating section in said housing and having a plurality of separate portions, one of said portions being one of a tape counter, a clock, a stopwatch; actuating means for selectively actuating separable ones of said portions, and disabling means for disabling the actuating means of separable ones of the portions of the operating section, an indicator coupled to each of the portions and responsive to operation of each of said portions for indicating the operating ones of the portions;

said disabling means including a plurality of gates having one input connected to said actuating means and an output connected to said operating section, said gates each have a second input, said disabling means having biasing means connected to each of said second inputs of each of said gates for biasing said gates into an on condition which renders said actuating means effective, said disabling means including an override switch connected to each of said second inputs of said gates for turning said gates off.

7. A tape recorder as in claim 6, wherein said switch is grounded.

8. A tape recorder as in claim 6, wherein said gates means include AND gates each having two inputs, wherein said actuating means includes a plurality of actuating switches one for each gate, each of said switches having two sides, a plurality of inverters each connecting one of said actuating swtiches to one input of said AND gates, the other input of each of said AND gates being biased to a first polarity, the sides of the switches more remote from the inverter being biased to a second polarity, and the side of the switch connected to the inverter being biased to the first polarity.

* * * * *